Nov. 29, 1960 L. B. FRONEK 2,961,771
INDEXING APPARATUS
Filed Aug. 4, 1959 3 Sheets-Sheet 1

INVENTOR
Louis B. Fronek

BY *[signature]*
ATTORNEY

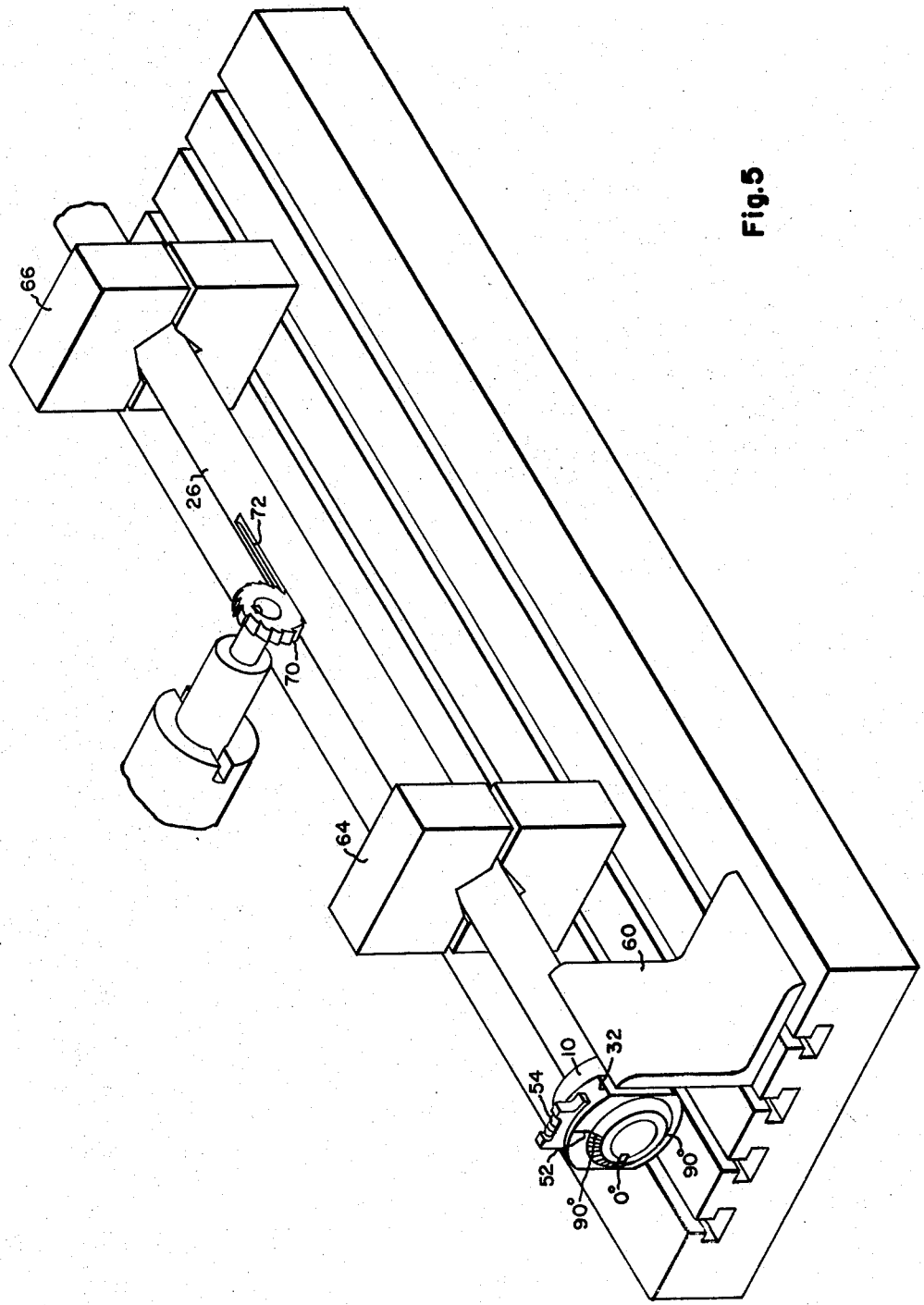

United States Patent Office 2,961,771
Patented Nov. 29, 1960

2,961,771

INDEXING APPARATUS

Louis B. Fronek, 12910 Park Knoll Drive, Cleveland 25, Ohio

Filed Aug. 4, 1959, Ser. No. 831,567

1 Claim. (Cl. 33—174)

This invention relates to a device for quickly and accurately determining the angular position of one point on the periphery of a shaft or the like with respect to another point on the same shaft. More particularly, the invention relates to apparatus for angularly positioning an elongated member for milling flats, drilling holes and locating keyways relative to each other within degrees and minutes.

In certain applications it is necessary to drill holes or mill keyways and the like at various angular positions spaced along the length of a shaft or other elongated member. Thus, in the case of keyways, one such keyway may be offset with respect to another by 30°, while a third keyway may be offset with respect to the original by 90°, and so on. Ordinarily, the angular positioning of the various keyways is determined by the use of a lay-out table, in which case the shaft is supported above the flat surface of the lay-out table; and the desired angular positions of keyways are first measured and marked on the outer periphery or edge of the end surface of the shaft. Thereafter, straight lines are scribed along the length of the shaft, starting from the various angular markings on the end surface. These lines must extend parallel to the axis of the shaft whereby they will mark the desired angular positions of the keyways on the curved surface which is to be milled. Before the keyway is milled, however, the scribed line on the shaft must be centered beneath a milling machine cutter so that the center line of the keyway will be coincident with the scribed line and the various keyways will be at their correct angular postions.

The foregoing procedure is not only painstaking and time consuming, but also gives rise to many errors and inaccuracies. Thus, an inaccuracy may result by failing to correctly measure the angular spacing between markings on the end of the shaft, by failing to scribe a perfectly straight line along the length of the shaft, or by miscentering the scribed line under the milling machine cutter. Furthermore, the various possible inaccuracies, although minor in themselves, may be compounded to result in a serious error. It is, therefore, apparent that the commonly accepted procedure for determining the angular position of keyways and the like on a shaft is not only unsatisfactory from the point of view of accuracy, but also expensive as regards labor costs.

The present invention has as its primary object the provision of means for accurately determining the angular position of one point on the periphery of a shaft with respect to another point or points.

More specifically, an object of the invention resides in the provision of a fixture for rapidly positioning an elongated shaft or the like under a milling machine cutter or drill whereby a bore, keyway or other machined surface may be accurately positioned in angular spacing with respect to other bores, machined surfaces or keyways on the shaft.

Still another object of the invention resides in the provision of apparatus of the type described which is characterized in that it need be connected to the shaft only and need not be in contact with any part of the milling machine. As will become apparent from the following description, this feature is particularly important in the case of exceptionally long shafts which extend out over the end of the milling machine table.

The above and other objects and features of the invention will become apparent from the following detailed description taken in connection with the accompanying drawings which form a part of this specification and in which:

Figs. 3, 4 and 5 illustrate the operation of the invention as applied to a conventional milling machine.

Figure 1:
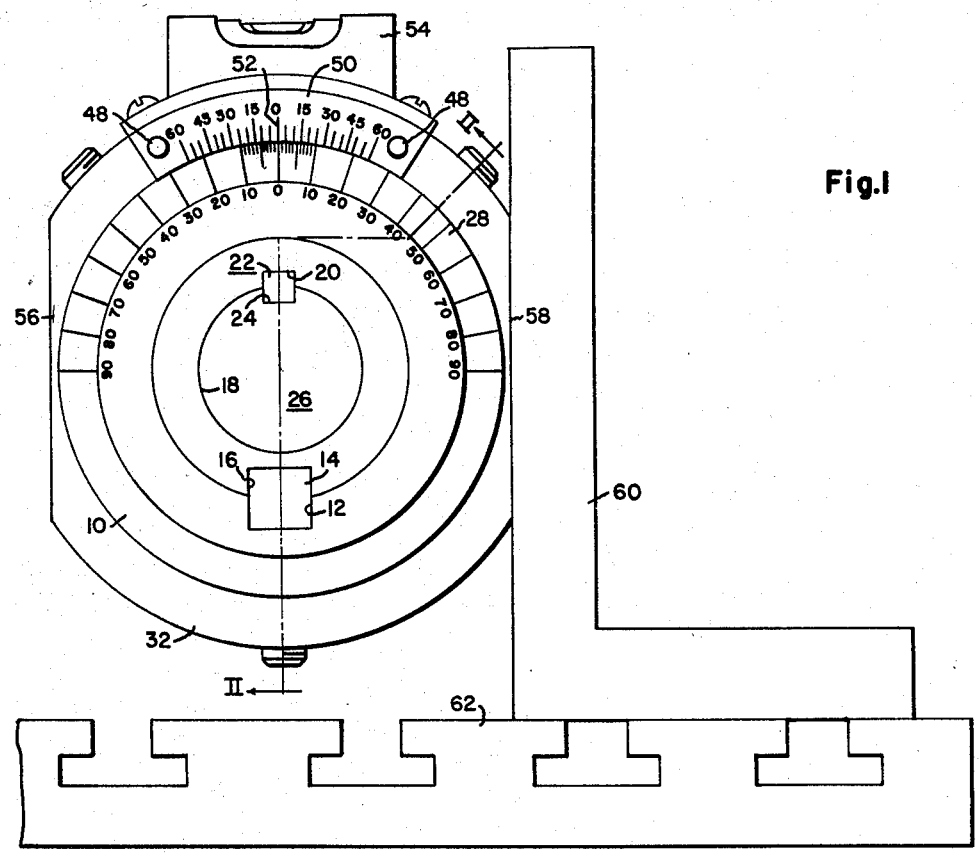
Figure 1 is an end view of the apparatus of the invention.
Figure 2:
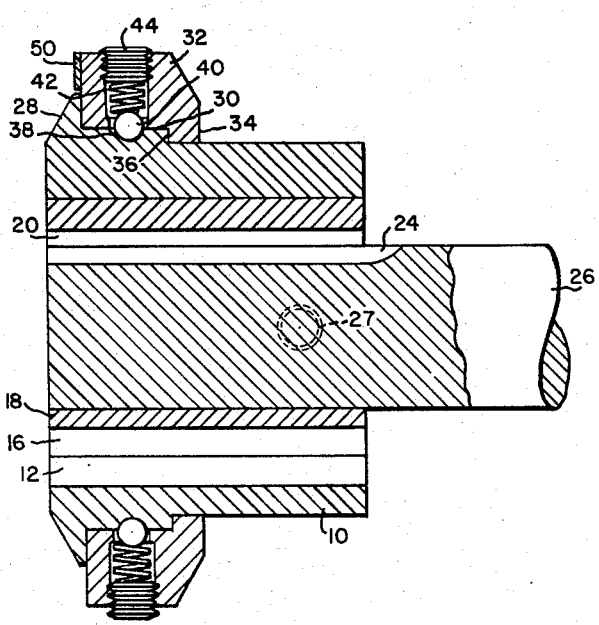
Fig. 2 is a cross-sectional view taken along line II—II of Fig. 1.

Referring now to Figs. 1 and 2, the invention includes an inner hub portion or sleeve 10 having a keyway 12 therein. The keyway 12 receives a key 14 which also fits into a keyway 16 in an adapter sleeve 18, the purpose of which is to accommodate the apparatus to shafts of various diameters and shapes. Thus, a separate adapter sleeve will be used for each shaft diameter. Similarly, adapter sleeves having hexagonal inner peripheries will be used for shafts of hexagonal cross section, and so on. Adapter sleeve 18 may be provided with a keyway 20 for a key 22 which also fits into a keyway 24 initially milled in the shaft 26. As will be understood, the keys 14 and 22 have been omitted in Fig. 2 for purposes of simplicity.

If the shaft 26 initially has a bore drilled therein or a flat milled on its surface, the key 22 obviously cannot be used to maintain the hub portion 10, adapter sleeve 18 and shaft 26 in secured relationship. Under these circumstances, a set screw, not shown, may be threaded into a bore 27 provided in the hub portion. The set screw will pass through a hole in the side of the adapter sleeve and engage the shaft 26 to hold all parts against relative rotation.

As shown in Fig. 2, the hub portion 10 is provided at its left end with a radially extending flange 28 having a beveled surface thereon. Immediately behind the flange 28 is a circular surface 30 extending along the axis of the assembly. Rotatable around surface 30 is an outer sleeve or annular member 32 having an inwardly extending flange 34 which abuts a shoulder 36 provided in the hub portion 10. As shown, the periphery of the surface 30 is provided with a circumferentially extending groove or race 38 for detents which hold the annular member 32 from rotating freely about hub portion 10. Each detent consists of a hardened steel ball 40, a helical coil spring 42, and a set screw 44. Obviously, the ease with which the annular member 32 may rotate around the surface 30 is dependent upon the force exerted on balls 40 by springs 42. This force, in turn, may be adjusted by turning the set screws 44.

In Fig. 1 it can be seen that the beveled surface of flange 28 on hub portion 10 is graduated in a scale of degrees with the center point of the scale being coincident with the axis of shaft 26 and with the zero degree calibration passing through a plane which also passes through the center lines of keyways 12, 16, 20 and 24. Secured to the forward face of annular member 32 by means of screws 48 or other similar fastening devices is a plate 50 provided with a vernier scale calibrated in minutes. As will be understood, the purpose of the vernier scale is to increase the accuracy of the device. Although this vernier scale may be eliminated, the zero marker line 52 must be placed on the annular member 32 to cooperate with the scale on flange 28 whereby the angular position of the marker with respect to the center line of keyway 24 may be determined. Secured to annular member 32 above the vernier scale 50 is a spirit level indicator 54 which will indicate a true level condition when marker line 52 lies in a vertical plane extending through the central axis of shaft 26. This plane will, of course, also extend through the zero degree calibration as well as the center lines of keyways 12, 16, 20 and 24.

Since the annular member 32 may rotate independently of the hub portion 10 which is keyed to shaft 26, the shaft may be rotated while the marker line 52 is maintained in a vertical position whereby the angle through which the shaft is rotated may be read directly from the scale of degrees on flange 28. If it is thus desired to maintain marker line 52 in a vertical position, the annular member 32 must be secured against rotation. To this end, two flat surfaces 56 and 58 are provided on either side of the annular member 32. It will be noted that these surfaces extend parallel to the vertical marker line 52. In this manner, a right angle square 60 may be positioned with one of its surfaces on the horizontal top of a milling machine table 62 and its other surface in abutment with surface 56 or 58. With such an arrangement, the annular member 32 will be held stationary while the shaft 26 and hub portion 10 may be rotated to any angular position indicated on the scale of degrees. Alternatively, the annular member 32 may be initially rotated to any angular position while the shaft 26 is secured against rotation. Thus, the member 32 may be rotated clockwise through, say, 40°; and the shaft then rotated in a counterclockwise direction until the spirit level 54 indicates a true level condition, at which point the shaft will obviously have rotated through an arc of 40°.

Figure 3:
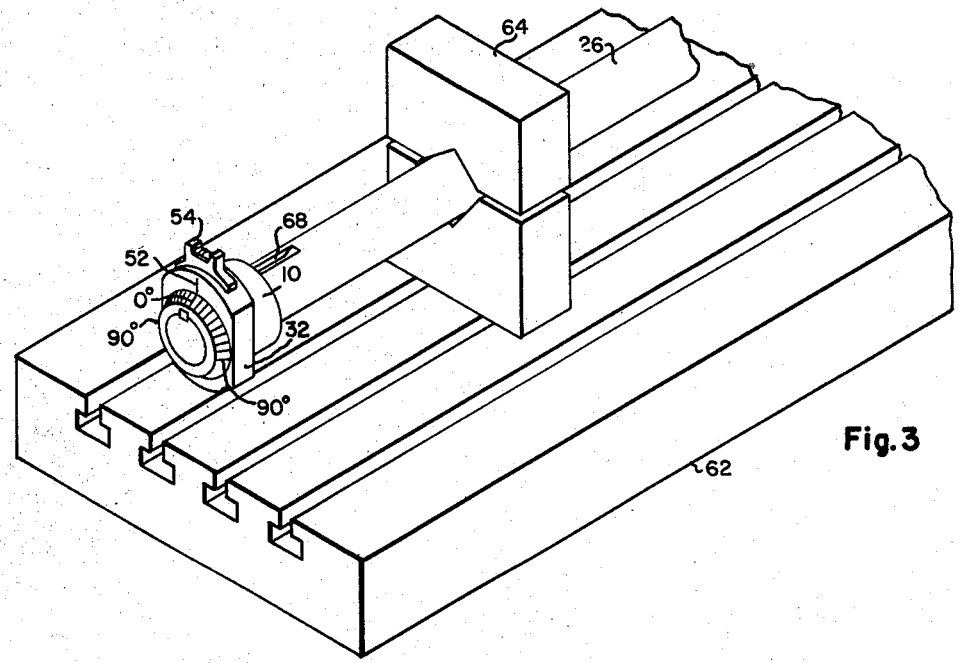
Figure 4:
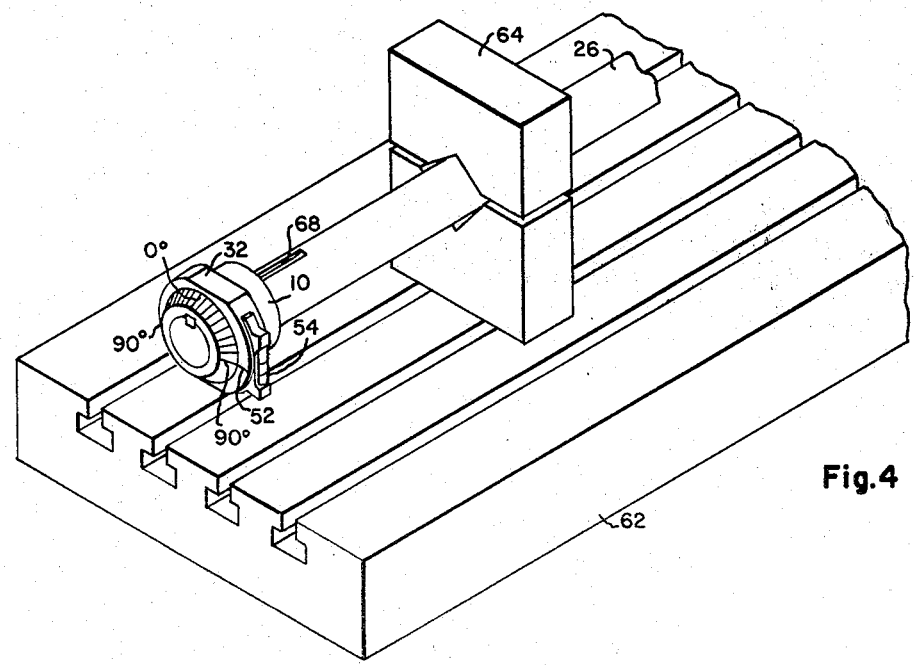

Operation of the invention may best be understood by reference to Figs. 3, 4 and 5. In these figures, the vernier scale 50 and the adapter sleeve 18 have been omitted for purposes of simplicity. A conventional milling machine table 62 is shown having a pair of V-clamps 64 and 66 thereon for securing the shaft 26 in a horizontal position. After the shaft 26 is thus secured in clamps 64 and 66, the first keyway, identified by the numeral 68 in Figs. 3 and 4, is milled. The operator then slides the indexing fixture of the present invention over the shaft and inserts a key into the keyway 68 in the shaft and the keyway 20 in adapter sleeve 18 if an adapter sleeve is employed. In Figs. 3–5 the adapter sleeve is omitted and the keyway 12 in hub portion 10 is at the top of the assembly rather than the bottom; however, the principle of operation is the same. If a hole or flat is produced in the shaft 26 rather than a key, then the aforesaid set screw which threads into bore 27 shown in Fig. 2 will be tightened to hold the hub portion 10 against rotation about shaft 26. It is, of course, important that the zero degree calibration on the scale of degrees and the marker line 52 be coincident with the center line of the keyway, hole or flat, as the case may be. Coincidence of the zero degree calibration and the center line of a keyway will be automatically accomplished when the key is inserted. If the zero degree calibration and the marker 52 are in this manner coincident with the center line of the previously milled keyway, the spirit level 54 will indicate a true level condition. This condition is shown in Fig. 3.

The annular member 32 is now rotated through a predetermined number of degrees. If the second keyway is to be milled at an angle of 45° with respect to the first keyway, then the annular member 32 is rotated until the marker line 52 coincides with the 45° calibration on the scale of degrees. Similarly, if the next keyway is to be displaced with respect to the first by 90°, then annular member 32 will be rotated until marker line 52 coincides with the 90° calibration on the scale of degrees. This condition is shown as an example in Fig. 4.

It will be noted that during rotation of member 32 the shaft 26 and hub portion 10 are clamped by members 64 and 66. Thereafter, the clamps 64 and 66 on the milling machine table 62 are released, and the shaft 26 is rotated in the opposite direction until the spirit level 54 again indicates a true level condition. When level 54 thus inticates a level condition, the shaft 26 will have rotated 90° in a counterclockwise direction for the example given. This condition is shown in Fig. 5 where the keyway 68, not shown, is now positioned to the left of the vertical center line. A true level condition can also be checked by placing the right angle square 60 against the surface 58 as illustrated in Fig. 5. When the shaft 26 has been rotated to the desired angle, the clamps 64 and 66 are then tightened and the milling machine cutter 70 mills another keyway 72 in the shaft, this keyway being displaced with respect to the original keyway 68 by 90°.

It will be understood, of course, that the foregoing is illustrative of only one way in which the invention may be used. Thus, if the original keyway is not at the end of the shaft but in the middle thereof, the inner hub portion 10 may be keyed to the shaft by means of a Woodruff key. If the original keyway is between the clamps 64 and 66, the shaft 26 will have to be removed from the clamps to permit the device to slide over the shaft until the first milled keyway is reached. In this case, when the shaft is again clamped by clamps 64 and 66, the positioning of the original keyway at the top dead center of the shaft 26 may be determined by the use of spirit level 54. That is to say, since the zero degree calibration on the scale of degrees will be coincident with the center line of the keyway, the marker line 52 may be aligned with the zero degree calibration and the shaft rotated until spirit level 54 indicates a true level condition. This will assure that the center line of the previously milled keyway lies in a vertical plane extending through the central axis of the shaft 26.

As long as the first milled keyway is positioned above the milling machine table 62, the annular member 32 may, as an alternative, be held against rotation by the right angle square 60, and the shaft 26 rotated to the desired angular position. If, however, the first milled keyway is beyond the end of the milling machine table 62, the right angle square 60 can no longer be used and the angular position of the second or subsequent milled keyway must be determined by the use of the spirit level 54 in the manner described above.

The invention thus provides a means for accurately and easily determining the angular position of one point on a shaft or the like with respect to another point. Although the invention has been shown in connection with a certain specific embodiment, it will be readily apparent to those skilled in the art that various changes in form and arrangement of parts may be made to suit requirements wiithout departing from the spirit and scope of the invention.

I claim as my invention:

Indexing apparatus for shafts and the like comprising a hub portion adapted to be secured to a shaft, an annular member rotatable around the outer periphery of said hub portion, a scale of degrees on the hub portion having a center point coincident with the axis of said shaft, a marker on the annular member adapted to cooperate with the scale of degrees on the hub portion whereby the angular position of the marker with respect to the zero degree calibration on the scale of degrees may be determined, a level indicator on said annular member which will indicate a level condition when the marker lies in a true vertical plane extending through the axis of said shaft, and means including a surface on the annular member extending parallel to a plane running through the axis of said shaft and said marker for maintaining the marker in said true vertical plane while permitting rotation of the hub portion.

References Cited in the file of this patent

UNITED STATES PATENTS

| | | |
|---|---|---|
| 1,284,879 | Donaldson | Nov. 12, 1918 |
| 2,170,824 | Lichtenwalner | Aug. 29, 1939 |
| 2,358,987 | Mackay | Sept. 26, 1944 |
| 2,611,971 | Rabatine | Sept. 30, 1952 |
| 2,656,818 | Moore | Oct. 27, 1953 |
| 2,737,722 | Keim | Mar. 13, 1956 |
| 2,743,699 | Hollis | May 1, 1956 |
| 2,895,225 | Eisele | July 21, 1959 |